(12) United States Patent
Fasen

(10) Patent No.: US 8,611,039 B2
(45) Date of Patent: Dec. 17, 2013

(54) ARRANGEMENT AND PROCESSING OF LONGITUDINAL POSITION INFORMATION ON A DATA STORAGE MEDIUM

(75) Inventor: Donald Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 13/260,174

(22) PCT Filed: Apr. 29, 2009

(86) PCT No.: PCT/US2009/042037
§ 371 (c)(1),
(2), (4) Date: Sep. 23, 2011

(87) PCT Pub. No.: WO2010/126494
PCT Pub. Date: Nov. 4, 2010

(65) Prior Publication Data
US 2012/0019948 A1    Jan. 26, 2012

(51) Int. Cl.
*G11B 5/584* (2006.01)
(52) U.S. Cl.
USPC ............................................ 360/77.12
(58) Field of Classification Search
None
See application file for complete search history.

(56) References Cited

U.S. PATENT DOCUMENTS

| | | | |
|---|---|---|---|
| 5,923,272 A * | 7/1999 | Albrecht et al. | 360/77.12 |
| 5,930,065 A * | 7/1999 | Albrecht et al. | 360/72.2 |
| 6,239,939 B1 * | 5/2001 | Bui et al. | 360/77.12 |
| 7,355,805 B2 | 4/2008 | Nakao et al. | |
| 7,440,224 B2 | 10/2008 | Ehrlich et al. | |
| 2004/0207943 A1 * | 10/2004 | Nakao et al. | 360/48 |
| 2005/0030662 A1 * | 2/2005 | Bui et al. | 360/48 |
| 2008/0117543 A1 * | 5/2008 | Bui et al. | 360/48 |
| 2008/0239559 A1 * | 10/2008 | Goker et al. | 360/77.12 |
| 2009/0279201 A1 * | 11/2009 | Cherubini et al. | 360/77.12 |
| 2009/0303635 A1 * | 12/2009 | Kabelac | 360/134 |
| 2009/0316296 A1 * | 12/2009 | Cherubini et al. | 360/77.12 |
| 2010/0079890 A1 * | 4/2010 | Brummet | 360/40 |
| 2010/0177435 A1 * | 7/2010 | Kabelac | 360/77.12 |

FOREIGN PATENT DOCUMENTS

| | | |
|---|---|---|
| EP | 1076330 | 2/2001 |
| JP | 2006-221729 | 8/2006 |

OTHER PUBLICATIONS

International Search Report and Written Opinion, dated Dec. 31, 2009, 14 pages.

* cited by examiner

*Primary Examiner* — Thang Tran

(57) ABSTRACT

There is described apparatus (800) to decode longitudinal position (LPOS) information from non-shifted servo elements (a1, a4, a7) and an unbroken sequence of plural shifted servo elements (a2-a3, a5-a6), variations in the relative displacement of the non-shifted and shifted elements encoding the LPOS information. The apparatus is operable to receive signals (905) from a transducer head apparatus (131) that detects the servo elements as they move past the transducer head apparatus, and to process the signals to obtain data (L1, L4, L5, L8) related to relative displacement of mutually adjacent shifted and non-shifted elements within respective ones of the servo bursts, and data (L2, L3, L6, L7) related to relative displacement of mutually non-adjacent shifted and non-shifted elements within the respective ones of the servo bursts, and also to process the data to determine LPOS bit values corresponding to the respective ones of the servo bursts.

11 Claims, 11 Drawing Sheets

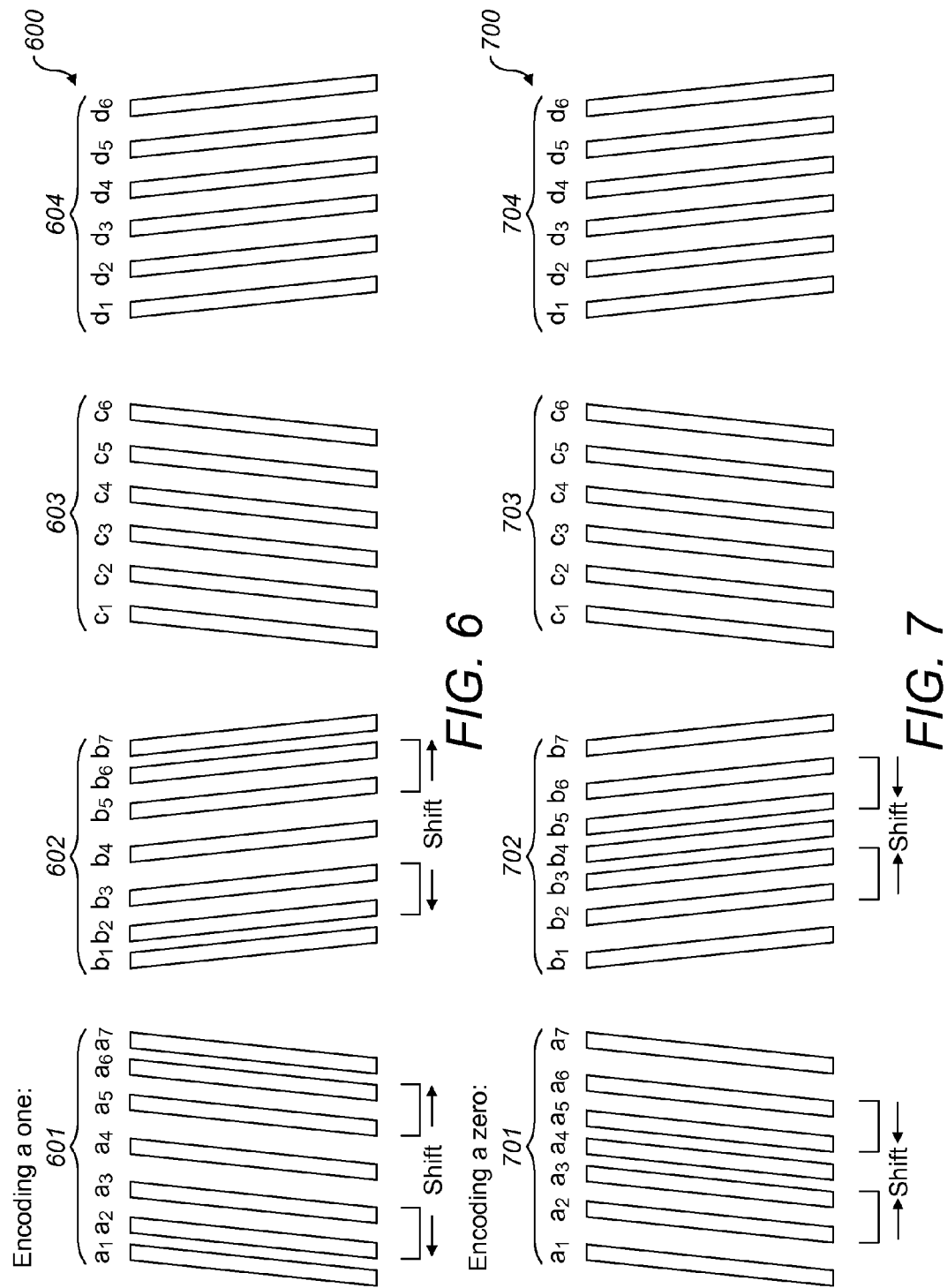

ARRANGEMENT AND PROCESSING OF LONGITUDINAL POSITION INFORMATION ON A DATA STORAGE MEDIUM

CROSS-REFERENCE TO RELATED APPLICATION

This application is a national stage application under 35 U.S.C. §371 of PCT/US2009/042037, filed Apr. 29, 2009.

TECHNICAL FIELD

The invention relates generally to the field of data storage.

BACKGROUND

It is known to use a data storage device to write data to and read data from a data storage medium as the data storage medium is driven relative to a transducer head of the data storage device, the data being arranged in data tracks extending along the data storage medium. It is also known to provide servo information extending in a longitudinal direction of the data tracks, the servo information including longitudinal position information indicative of position along the data storage medium in a direction of the data tracks. In use, with the data storage medium driven relative to a transducer head of the data storage device, the servo information can be detected by one or more transducers of the head, and processed to provide feedback in one or more servo loops to facilitate control, for example, of a lateral position of the transducer head relative to the data tracks, drive speed of the data storage medium, and/or longitudinal positioning of the transducer head along the data storage medium.

Accurate determination of position and speed of the data storage medium relative to the transducer head, for example in the presence of noise in the detected servo signal, is desirable. As track pitch is increased between generations of storage technology, to provide desired increases in performance including storage density, noise in the servo track signal is likely to increase.

SUMMARY

According to the invention, there is provided decoder apparatus as claimed in claim 1.

According to a further aspect of the invention, there is provided a method of decoding longitudinal position information as claimed in claimed 7.

According to a still further aspect of the invention, there is provided a storage medium having stored thereon longitudinal position information, as claimed in claim 10.

According to a still further aspect of the invention, there is provided data storage apparatus as claimed in claim 14.

BRIEF DESCRIPTION OF THE DRAWINGS

In order that the invention may be well understood, by way of example only, various embodiments of the invention will now be described, with reference to the accompanying drawings in which:

FIGS. 6 and 7 illustrate in exaggerated form respective arrangements of servo elements for encoding an LPOS bit having a value of one and an LPOS bit having a value of zero;

DETAILED DESCRIPTION

Figure 1:
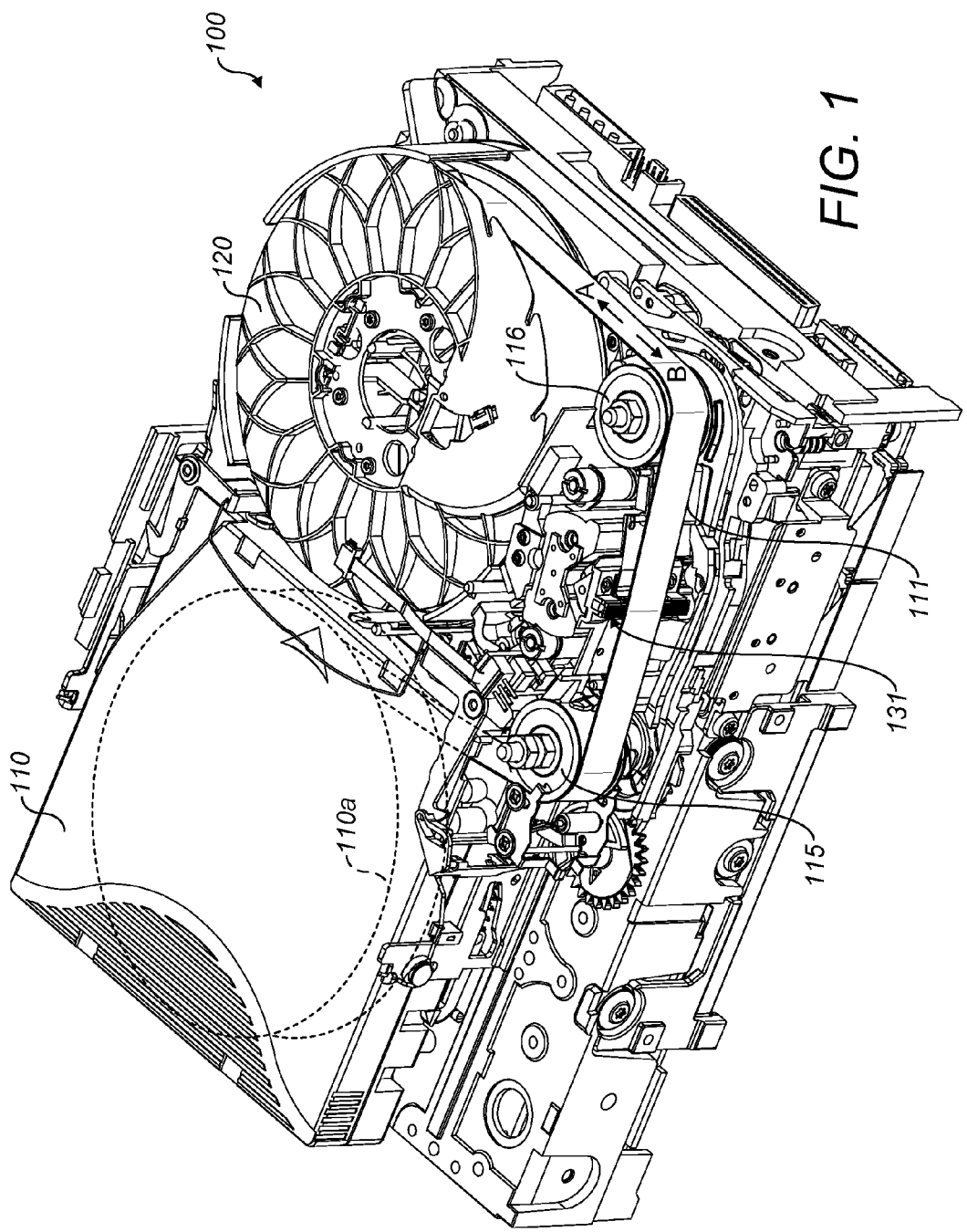
FIG. 1 is a perspective view of storage apparatus in the form of portions of a tape drive.

FIG. 1 shows data storage apparatus in the form of portions of a tape drive 100. A single reel tape cartridge 110 comprising a data storage medium in the form of a magnetic data storage tape 111 is removably receivable in the tape drive 100. In use, a free end of the tape 111 from a cartridge reel 110a is threaded 110 along a path in contact with guides 115, 116 onto a take-up reel 120 of the tape drive 100, enabling the tape 111 to be spooled onto the take-up reel 120. Drive apparatus in the form of respective electric motors 232 (FIG. 2) is provided to drive the cartridge reel 110a and the take-up reel 120, to move the tape 111 in a longitudinal direction A, B of the tape 111 along the tape path in contact with transducer head elements 220, 230 (FIG. 2) of a transducer head apparatus 131 having an actuator such as a voice coil motor or other arrangement for moving the transducer head elements 220, 230 laterally of the tape 111. Reel speed sensors 238 (FIG. 2), for example Hall-effect sensors or any other suitable form of sensor, are provided for sensing the speed of the cartridge reel 110a and the take-up reel 120. The tape drive 100 also comprises data-processing apparatus, described below, for controlling various functions of the tape drive 100.

Figure 2:
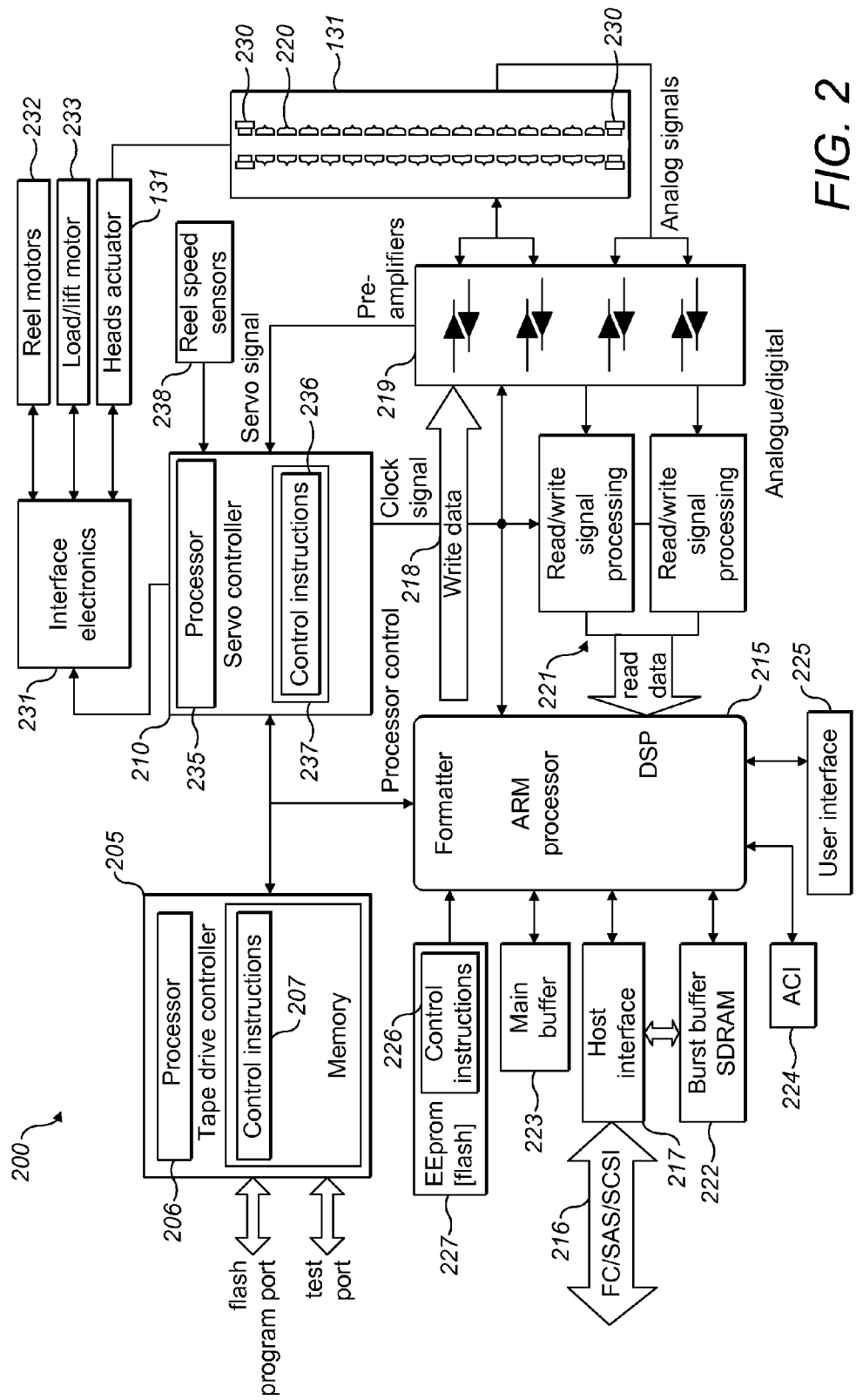
FIG. 2 is a functional diagram of an exemplary control arrangement of the tape drive of FIG. 1.

FIG. 2 is a functional block diagram showing an exemplary tape drive control arrangement 200 including a servo controller 210, a formatter 215, and a tape drive controller 205 for overall control of the tape drive 100. The functions of the tape drive controller 205 are performed by processing apparatus 206 that operates to execute computer program instructions 207 stored in memory 208 of the tape drive controller 205.

Under control of the tape drive controller 205, the formatter 215 receives through an interface 217 user data transmitted using any suitable protocol 216 from one or more host computers (not shown). The formatter 215 processes the received user data into suitably formatted code words that are transferred through an internal communications medium 218 to a bank of pre-amplifiers 219 that provide analogue signals to read/write transducer head elements 220 of the transducer head apparatus 131 for writing to the data storage tape 111. Analogue signals read by the read/write transducer head elements 220 from the tape 111 are passed back through the pre-amplifiers 219, converted into digital signals using processing circuitry 221 and timing information received from the servo controller 210, and processed by the formatter 215 for transmission through the interface 217 to a host computer.

In FIG. 2, the read/write transducer head elements 220 are shown as 16 horizontally aligned read/write head element pairs, each element of each pair being capable of reading and writing. When the magnetic tape 111 moves past the head elements 220, one element of each head element pair writes data to the magnetic tape and the other elements of each head element pair immediately reads the data for error detection purposes. The roles of the head elements 220 in each pair are reversed when the tape 111 travels in the opposite direction. In alternative embodiments, a greater or lesser number of read/write head elements 220 can be provided, and/or the read/write head elements 220 can be provided in a single array and not in pairs.

Buffers 222 and 223 are provided to facilitate management of data flows by the host interface 217 and formatter 215 respectively. An automation control interface 224 can be provided to enable operation of the tape drive 100 in a tape library, and/or a user interface 225 can be provided for direct interaction of the tape drive 100 with a user. The functions of the formatter 215 are provided by processing apparatus that operates to execute computer program instructions 226 stored in memory 227.

Under control of the tape drive controller 205, the servo controller 210 receives, via the pre-amplifiers 219, analogue servo signals produced by servo transducer heads 230 of the transducer head apparatus 131 and processes the received servo signals, as described in further detail below. The servo transducer heads 230 are arranged as horizontally aligned pairs of read elements disposed at opposite ends of the arrays of read/write head elements 220, to respectively read information from two servo bands of a formatted magnetic tape, also described in further detail below.

The servo controller 210 also receives and processes signals from the reel speed sensors 238. The server controller 210 is operable to deterministically control, communicating through suitable interfaces 231, tape drive functions such as lateral positioning of the data transducer heads 220 by the actuator of the transducer head apparatus 131, operation of the reel motors 232 for controlling tape longitudinal speed and position, and operation of one or more motors 233 for loading and unloading the cartridge 110 and/or actuating a tape lifting device. The functions of the servo controller 210 are provided by processing apparatus 235 that operates to execute computer program instructions 236 stored in memory 237.

Figure 3:
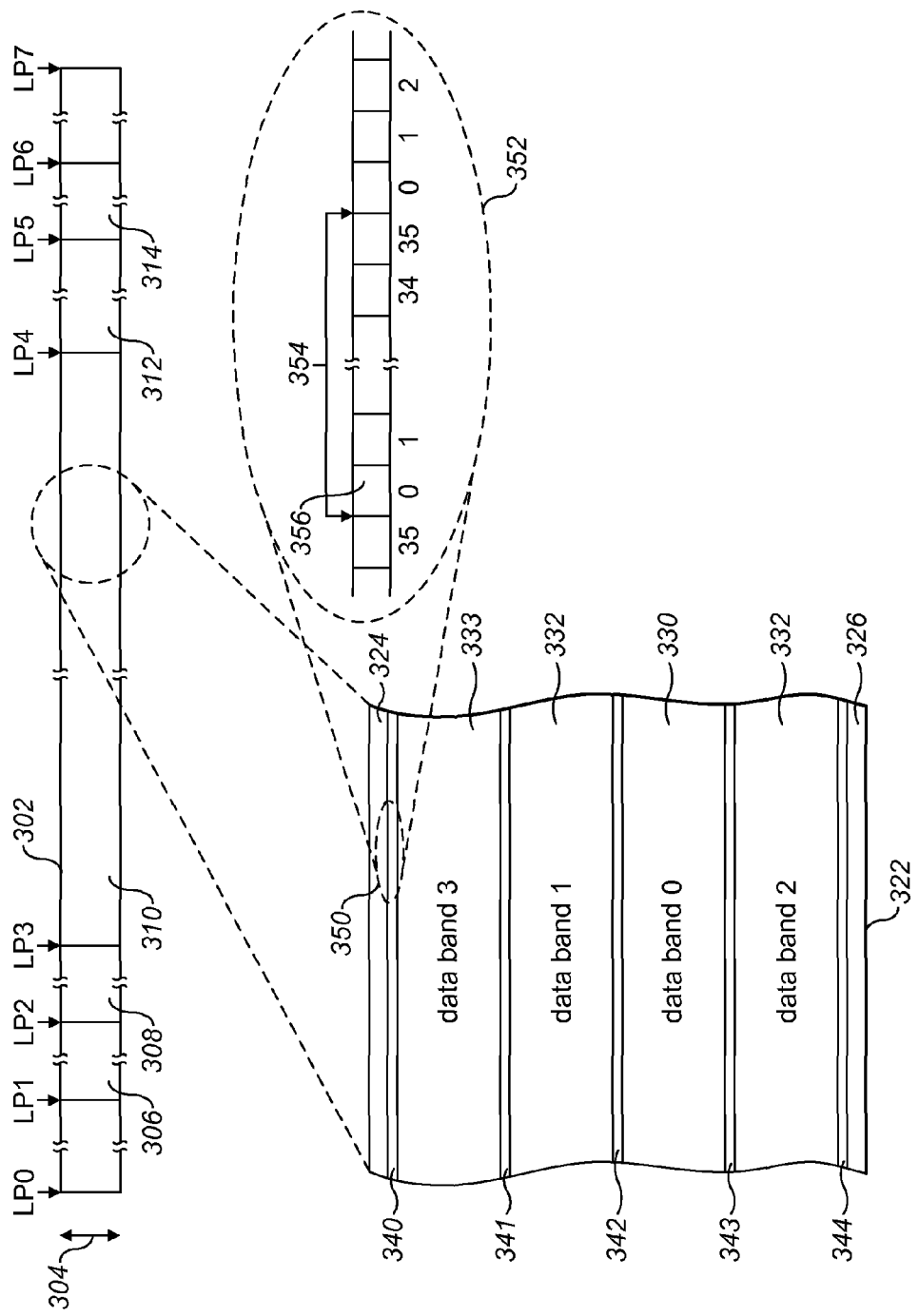
FIG. 3 it is a schematic view of a storage medium, including detailed views of an exemplary arrangement of data bands and servo tracks.

FIG. 3 shows the structure and formatting of an exemplary magnetic tape 302, similar to the tape 111. The magnetic tape 302 accords to an LTO (linear tape open) magnetic tape technology standard and extends longitudinally up to 820 m, with a width 304 of 12.65 cm. The magnetic tape has a base substrate such as polyethylene terephthalate, coated with a layer of ferro-magnetic material dispersed in a suitable binder. The tape is divided into seven logical regions bounded by eight logical points LP0 through LP7. The logical regions include a forward servo acquisition region 306, a calibration region 308, a user data region 310, an unspecified data region 312 (which may have zero length depending on tape configuration), and a reverse servo acquisition region 314.

FIG. 3 also shows a detailed view of a portion 322 of the user data region 310 of the tape 302. The user data region 310 has five servo bands 340-344 extending in a longitudinal direction of the tape 302, which can be pre-recorded on the tape 302 at manufacture. Edge-guard bands 324 and 326 are provided at the top and bottom of the user data region 310, and a respective data band 330-333 is defined between each pair of the servo bands 340-344. Each servo band 340-344 comprises a longitudinally extending sequence of longitudinal position (LPOS) words.

FIG. 3 further shows a detailed view 352 of a portion 350 of one of the servo bands 340. Each LPOS word 354 is encoded over 36 servo frames, such as servo frame 356. Each LPOS word 354 encodes a synchronisation mark, a longitudinal position (LPOS) value, and optional manufacturer's data. Each servo frame encodes one bit of LPOS data. The LPOS words are recorded continuously along the length of the tape, and the LPOS value increments by one every 36 servo frames.

Figure 4:
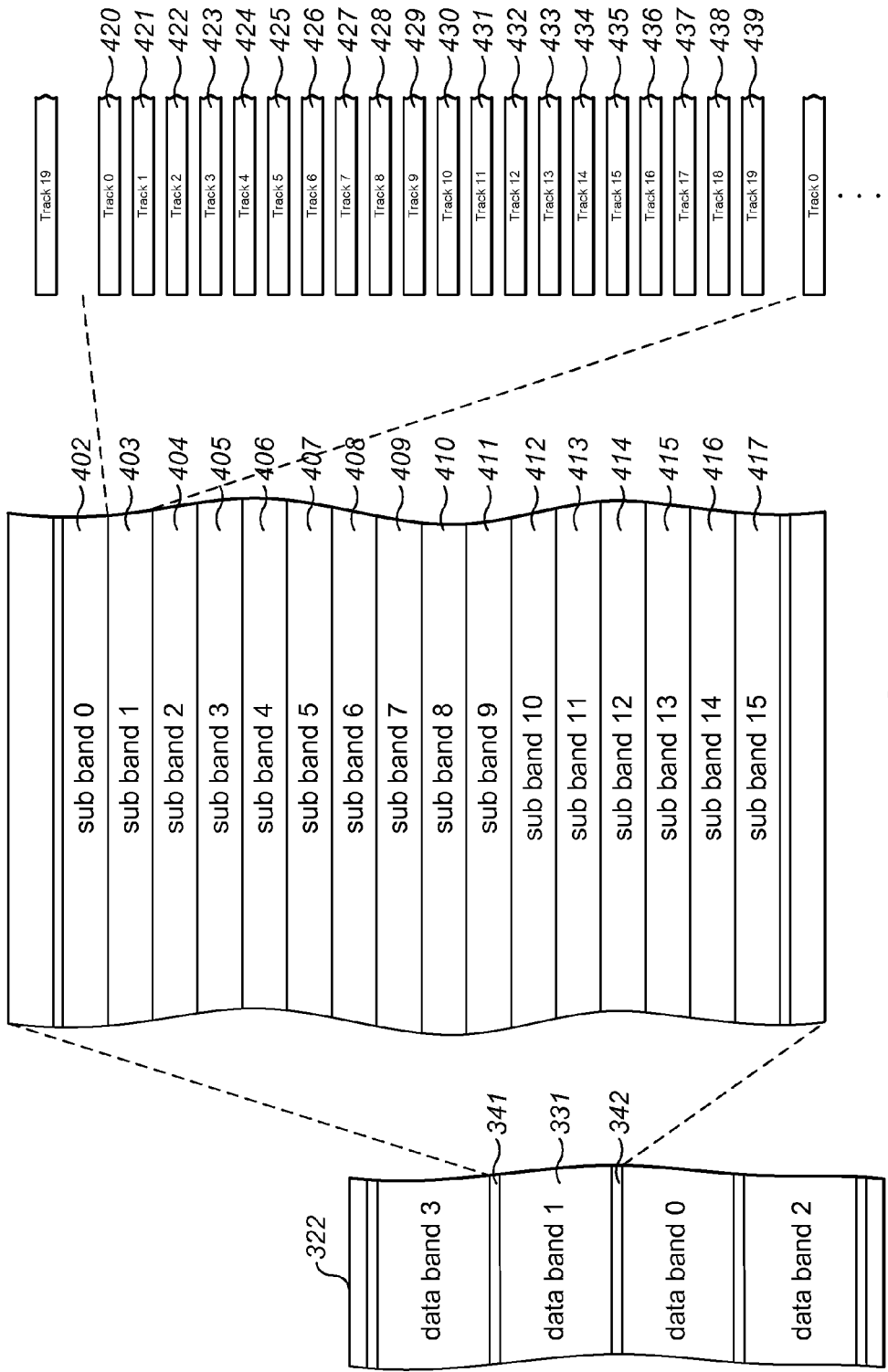
FIG. 4 illustrates further details of the data bands, including an exemplary arrangement of data tracks in the data bands.

FIG. 4 shows a detailed view of a format structure of one of the data bands 331 of the portion 322 of the user data region 310 of the tape 302. Each of the data bands 330, 332, 333 has a corresponding structure. The data band 331, bounded on each side by servo bands 341 and 342, is divided into 16 data sub-bands 402-417, the number of data sub-bands corresponding to the number of read/write head elements 220. Each sub-band, such as sub-band 403, is in turn divided into 20 parallel data tracks 420-439. The format allows for the servo bands 340-344 to be pre-recorded on the tape 302 at manufacture, the pre-recorded servo bands 340-344 defining the regions of the data bands 330-333, the data tracks 420-439 being written according to the format during use.

In use, the read/write head elements 220 are positioned within a same one of the data bands 330-333. Each read/write head element 220 pair is aligned with a respective track in a respective sub band 402-417 corresponding to that head element pair. That is, each of the 16 read/write head element pairs reads data from and/or writes data to a data track in a corresponding one of the data sub-bands 402-417. The two servo head 230 element pairs are positioned over respective servo bands 340-344 bounding opposite longitudinal sides of the presently used data band 330-333. The 16 read/write head element 220 pairs, concurrently read from and/or write to the tape 320.

While the above-described format and structure corresponds to the Ultrium 5 LTO (linear tape open) standard, it will be understood that alternative embodiments can include different, for example significantly increased, numbers of data bands, and/or different, for example significantly increased, numbers of sub-bands within each data band, and/or different, for example significantly increased, numbers of data tracks within each sub-band. Such alternative formats will likely result in an increase in noise in the servo signal, due to the decreased track pitch, that is, the decreased distance between the centre lines of the data tracks.

In alternative embodiments, at least some of the servo bands could be written during use instead of being pre-recorded, and/or instead of dedicated servo bands, servo information could be written along a longitudinally extending portion of at least some of the data tracks.

Figure 5:
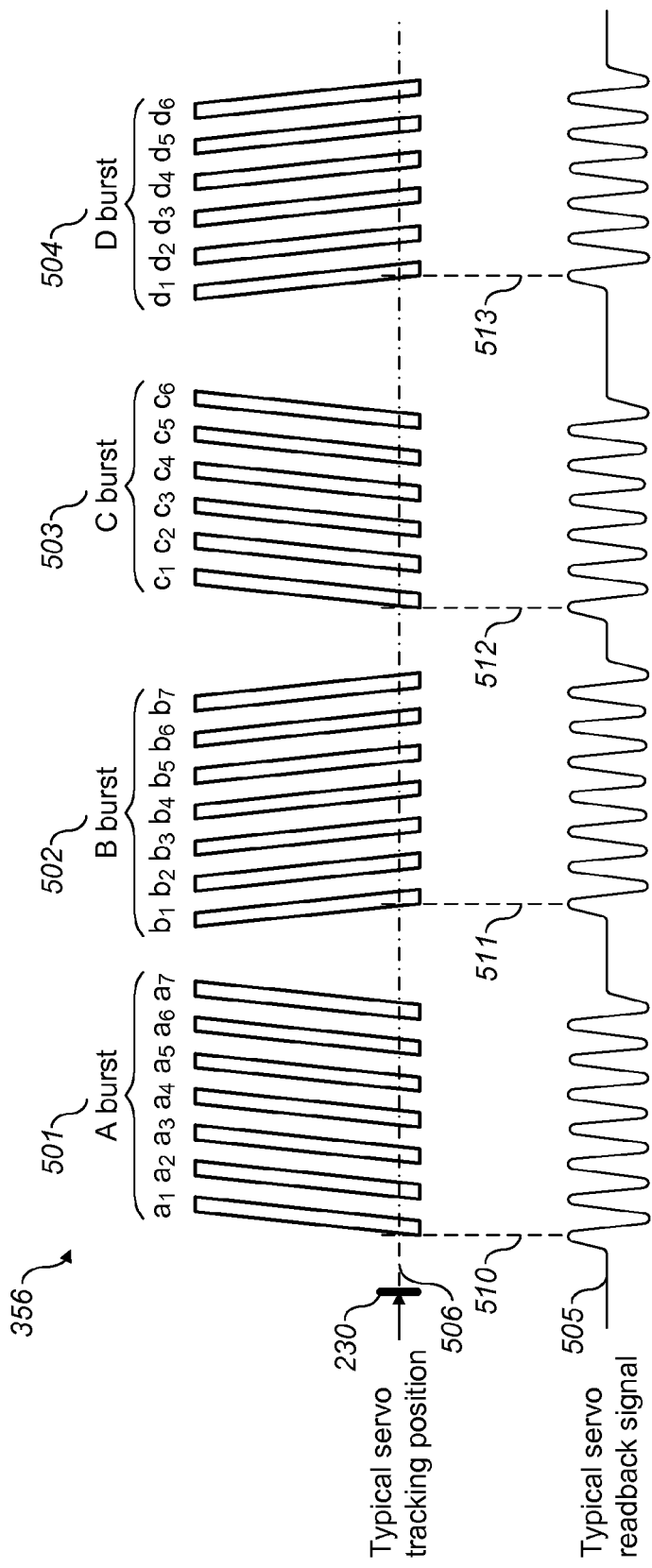
FIG. 5 is a schematic view of a portion of a servo band and read back signal, illustrating an exemplary arrangement of servo elements in a servo frame.

FIGS. 5-7 and 9 show further details of the servo frames, such as the servo frame 356 of the servo band 340 FIG. 3. Each servo frame comprises a longitudinally extending sequence of servo elements in the form of pre-recorded magnetic stripes. As shown in FIG. 5, the exemplary servo frame 356 comprises an A burst 501 having a group of seven azimuthally inclined stripes a1-a7, a B burst 502 having a group of seven oppositely azimuthally inclined stripes b1-b7, a C burst 503 having a group of six stripes c1-c6 azimuthally inclined similarly to the A burst stripes, and a D burst 504 having a group of six stripes oppositely azimuthally inclined to the C burst stripes.

As the tape 302 moves in a direction to the left as shown in FIGS. 5-7 and 9, respective signals are generated by the servo transducer head elements 230 and transmitted to the servo controller 210 through the preamplifiers 219. An exemplary servo readback signal 505 is shown in FIG. 5. Broken line 506 shows a typical tracking path of one of the servo head elements 230 along the servo band 340. As the servo head element 230 encounters a positive transition of one of the stripes a1-a7, b1-b7, c1-c6, d1-d6 a corresponding positive peak is produced in the signal 505, for example as shown by broken lines 510-513. Similarly, as the servo head element 230 encounters a negative transition in one of the stripes a1-d6, a corresponding negative peak is produced in the signal 505.

For a substantially constant tape speed and a substantially constant lateral tracking position, the time between peaks corresponding to stripes of mutually opposite azimuth should progressively change as the servo head 230 traverses the servo band 340, and the time between peaks corresponding to the stripes of the same azimuth should remain substantially constant. The signal 505 can be processed as described in further detail below to detect peaks in the signal to determine a lateral position of the servo head element 230 relative to the tape 302, to control a position of the read/write head elements 220 relative to respective ones of the data tracks 420-439. The difference between the number of stripes in the A and B bursts and the number of stripes in the C and D bursts assists in the identification of the start and end of frames 356 during processing.

FIG. 6 illustrates a servo frame 600 having bursts of servo stripes encoding an LPOS bit having a value of one. The stripes c1-c6 and d1-d6 within each of the C and D bursts 603, 604 have a specified regular relative longitudinal displacement of, for example, 5.00 μm, or any other convenient distance. Stripes a2 and a3 of the A burst 601 have each been shifted from a regular relative displacement, longitudinally away from the non-shifted centre stripe a4 of the A burst 601 (to the left in FIG. 6) and closer to the non-shifted outer stripe a1 of the A burst by a shift distance of, for example, 0.25 μm, or any other convenient distance. Stripes a5 and a6 of the A burst 601 have each been shifted from a regular relative displacement, longitudinally away from the centre stripe a4 of the A burst 601 (to the right in FIG. 6) and closer to the non-shifted outer stripe a7 of the A burst by the shift distance of 0.25 μm, or any other convenient distance. It will be apparent that the shift distances as shown in FIGS. 6 and 7 are exaggerated in order to better illustrate the principles described. The pattern of relative displacement between the shifted and non-shifted stripes within the A burst is used to encode the value of the LPOS bit. Stripes b2, b3, b5 and b6 of the B burst 602 are shifted longitudinally away from the centre stripe b4 in a manner analogous to the shifts in the corresponding A burst stripes, to redundantly encode the same LPOS bit value as the A burst 601.

FIG. 7 illustrates a servo frame 700 having bursts of servo stripes encoding an LPOS bit having a value of zero. The stripes c1-c6 and d1-d6 within each of the C and D bursts 703, 704 have a regular relative longitudinal displacement of, for example, 5.00 μm, or any other convenient distance. Stripes a2 and a3 of the A burst 701 have each been shifted from a regular relative displacement, longitudinally towards the non-shifted centre stripe a4 of the A burst 701 (to the right in FIG. 7) and closer to the non-shifted outer stripe a1 of the A burst 701 by a shift distance of, for example, 0.25 μm, or any other convenient distance. Stripes a5 and a6 of the A burst 701 have each been shifted from a regular relative displacement, longitudinally towards the centre stripe a4 of the A burst 701 (to the left in FIG. 7) and away from the non-shifted outer stripe a7 of the A burst 701 by the shift distance of 0.25 μm, or any other convenient distance. The pattern of relative displacement between the shifted and non-shifted stripes within the A burst is used to encode the value of the LPOS bit. Stripes b2, b3, b5 and b6 of the B burst 702 are shifted longitudinally towards the centre stripe b4 in a manner analogous to the shifts in the corresponding A burst stripes, to redundantly encode the same LPOS bit value as the A burst 701.

The A and B bursts of the frames in the servo bands 340-344 similarly redundantly encode a further LPOS bit per frame. Servo signals generated by the A burst 601, 701 and/or B burst 602, 702 can be processed in any convenient manner to decode the LPOS bit value, for example according to a process described below.

Figure 8:
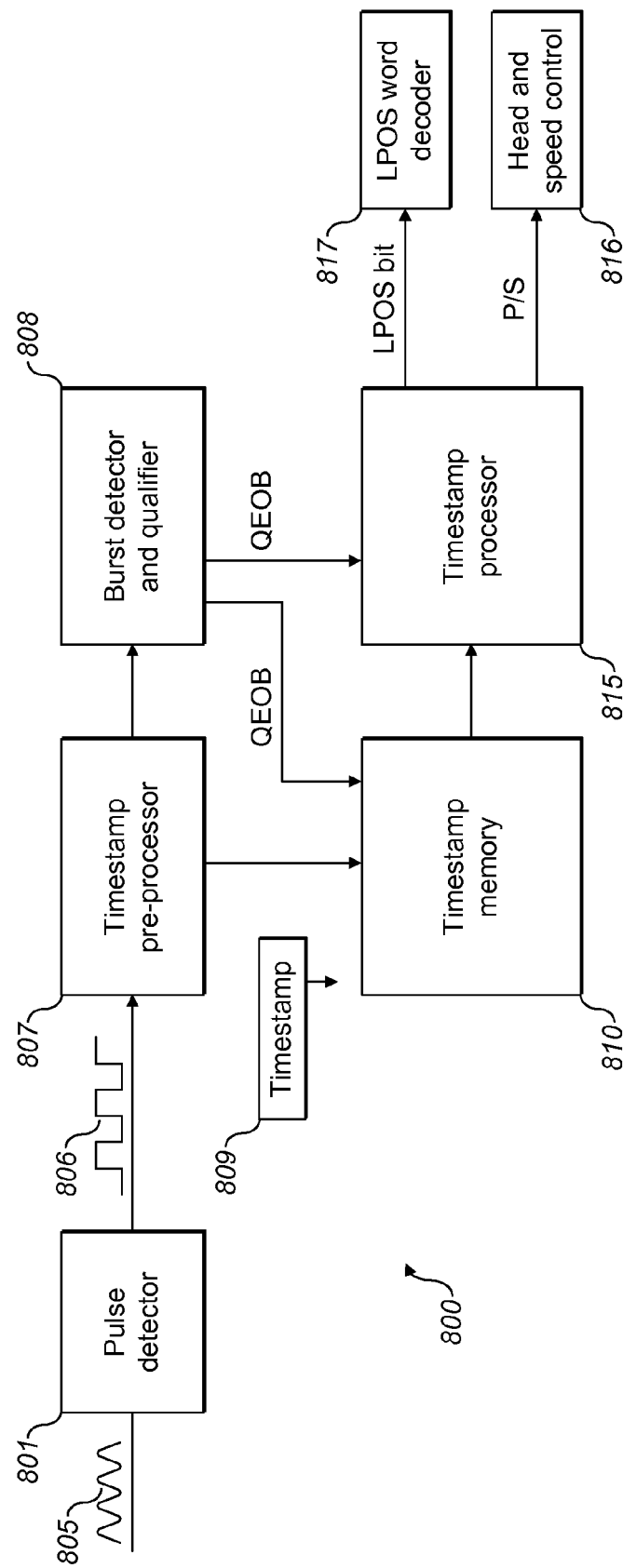
FIG. 8 is a functional diagram of decoder apparatus for processing servo read back signals to decode LPOS information.

FIG. 8 is a functional diagram showing processing apparatus 800 of the servo controller 210, for processing servo readback signals to decode information, including LPOS information, from the servo frames of FIGS. 6 and 7. As shown in FIG. 8, the servo controller 210 further includes a pulse detector 801 comprising circuitry that receives the pre-amplified and filtered servo readback signal 805 and outputs a series of discrete pulses 806. The leading edges of the pulses 806 correspond to the positive peaks of the readback waveform 805. However, alternatively or additionally, pulses corresponding to other waveform characteristics could be provided, for example corresponding to the negative peaks of the readback waveform 805. The pulses 806 are received by a timestamp pre-processor 807 that creates for each pulse 806 a timestamp consisting of the value of a free running counter corresponding to the time of receipt of the pulse. The timestamps 809 are stored in registers in a timestamp memory 810, the registers being arranged in banks, each bank corresponding to a servo burst. In the present embodiment, there are four banks storing timestamps from four bursts namely the next burst (not yet completely received), current (most recently completed burst), previous and double previous burst.

Burst detector and qualifier circuitry 808 is also provided that can include, for example, a burst qualifier and pattern detector. The burst qualifier tests for example whether a detected burst contains a minimum number of pulses and minimum gap between pulses, and is operable to output a qualified end of burst signal QEOB following a successful test. The pattern detector determines whether a detected sequence of bursts is valid, for example whether the last 4 bursts received comprise one of the following sequences: 7766, 7667, 6677 or 6776.

A timestamp processor 815 is provided for receiving the timestamps 809 of each burst from the timestamp memory 810 and processing the timestamps 809 to determine tape speed, LPOS bit value, and lateral position of the head elements 220, 230 relative to the tape 302.

Figure 9:
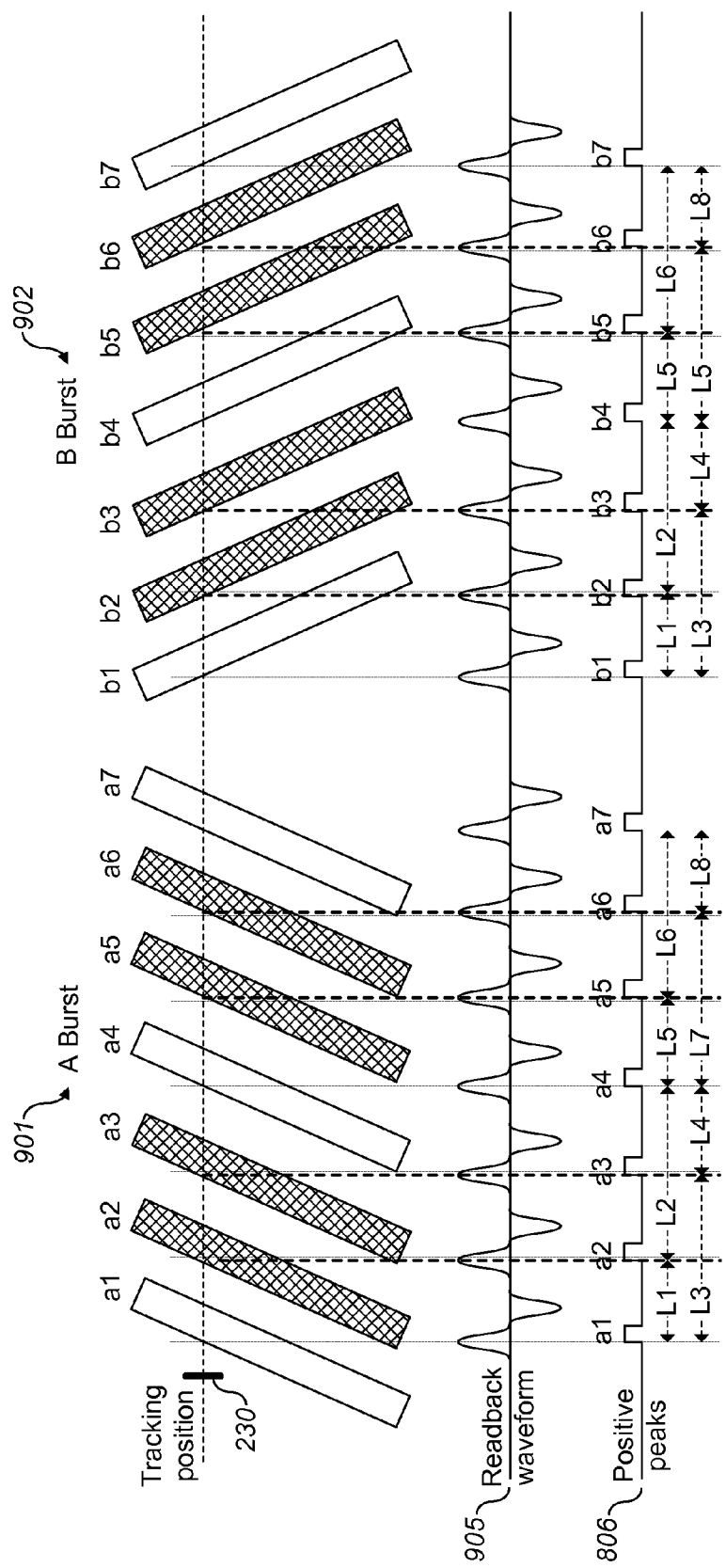
FIG. 9 shows a servo element arrangement according to FIG. 5, together with data values that can be derived from signals generated using the servo elements.

FIG. 9 shows seven-stripe A and B bursts 901, 902 similar to the A and B bursts 501, 502, 601, 602 of FIGS. 5 and 6. FIG. 9 also shows a representation of the pre-amplified and filtered feedback signal 905 generated by the servo transducer head 230, and an exemplary series of pulses 806 generated by passing the readback waveform 905 through the pulse detector 801 and detecting the positive peaks of the waveform 905. Each pulse corresponds to, and has being given a similar reference numeral to, a respective stripe a1-a7, b1-b7 from which it was generated. Narrower vertical broken lines correspond to the theoretical regular (unshifted) positions of positive transitions of all stripes a1-a7, b1-b7 relative to an exemplary tracking position of the servo head element 230, and thicker vertical broken lines correspond to actual positions and signals of the positive transitions of the shifted stripes a2, a3, a5, a6, b2, b3, b5, b6 for the same servo head element tracking position.

To determine lateral position of the servo head element 230, the timestamp processor is operable to use the timestamps 809 to calculate and accumulate time differences, for example b1–a1, b2–a2, b3–a3, b4–a4, b5–a5, b6–a6, or d1–c1, d2–c2, d3–c3, d4–c4, d5–c5, d6–c6 (FIGS. 5 to 7), between respective corresponding positive signal peaks in consecutive bursts of opposite azimuth, sometimes called the P value. Accumulating the time differences effectively allows for an averaging out of isolated errors in some pulses, for example errors caused by thermal asperities. The timestamp processor is also operable to calculate and accumulate the time differences c1–a1, c2–a2, c3–a3, c4–a4, c5–a5, c6–a6 between respective corresponding positive peaks in selected bursts of the same azimuth, sometimes called the S value, and to calculate the P/S ratio. Alternatively or additionally, another signal characteristic such as negative peaks can be employed, and/or time differences between stripes in other combinations of bursts could be used, including bursts in adjacent frames. The P/S ratio provides an indication of lateral position of the servo head 230 that also accounts for tape speed. The timestamp processor 815 outputs the P, P/S and/or S data to a processor 816 for controlling lateral position of the read/write head elements relative to data tracks 420-439, and/or for controlling speed of the reel motors 232.

FIG. 9 illustrates data values in the form of time difference values L1-L8 that can be obtained by the decoder apparatus from the A and B servo bursts 901, 902, each of which redundantly encodes an LPOS bit value. The four shifted stripes a2, a3, a5, a6 and b2, b3, b5, b6 in each burst 901, 902 are shown with hatching in FIG. 9. The non-shifted stripes are shown without hatching. The timestamp processor 815 is operable to receive from the timestamp memory an array of timestamps 809 corresponding to the stripes a1-a7 or b1-b7 in an A or B burst, and process the timestamps 809 to generate data in the form of time difference values L1-L8 related to relative displacement of mutually adjacent shifted and non-shifted stripes within the received servo burst.

In one embodiment, the timestamp processor 815 is operable to generate an LPOS value by accumulating the time difference values L1-L8, with a different sign (positive or negative) being used for the time differences L1, L3, L6, L8 involving the non-shifted stripes at opposite ends of a burst and the time differences L2, L4, L5, L7 involving the central non-shifted stripe. For example, considering the A burst 901:

LPOS value=(a2–a1)–(a4–a2)+(a3–a1)–(a4–a3)–
(a5–a4)+(a7–a5)–(a6–a4)+(a7–a6)

The timestamp processor 815 is operable to compare the LPOS value against a zero value to determine if the LPOS bit is a one or zero. In FIG. 9, the direction of the shift of the shifted stripes a2, a3, a5, a6 and b2, b3, b5, b6 is away from the central non-shifted stripe a4, b4, the LPOS value is negative and the LPOS bit is a one. Conversely, where the direction of shift is inwardly toward the central non-shifted stripe, the LPOS value is positive and the LPOS bit is a zero.

The timestamp processor 815 is operable to transmit the resulting LPOS bit data to an LPOS word decoder 817 that is operable to process the LPOS bit values to construct an LPOS word. In some embodiments, the timestamp processor 815 is operable to provide the LPOS word decoder 817 with LPOS bit quality information that can be used by the LPOS word decoder 817 to better determine the correct sense of the LPOS bit where LPOS bit values are redundantly provided from multiple servo bursts.

In alternative embodiments, the signals in the readback waveform 905 can be processed in other ways. For example, individual time differences could be compared to a nominal reference, the sign of the deviation from the nominal reference (positive or negative) indicating a logical one or a logical zero. Additionally or alternatively, the negative peak signal information can be processed analogously to the processing of the positive peak single information described above.

Figure 10:
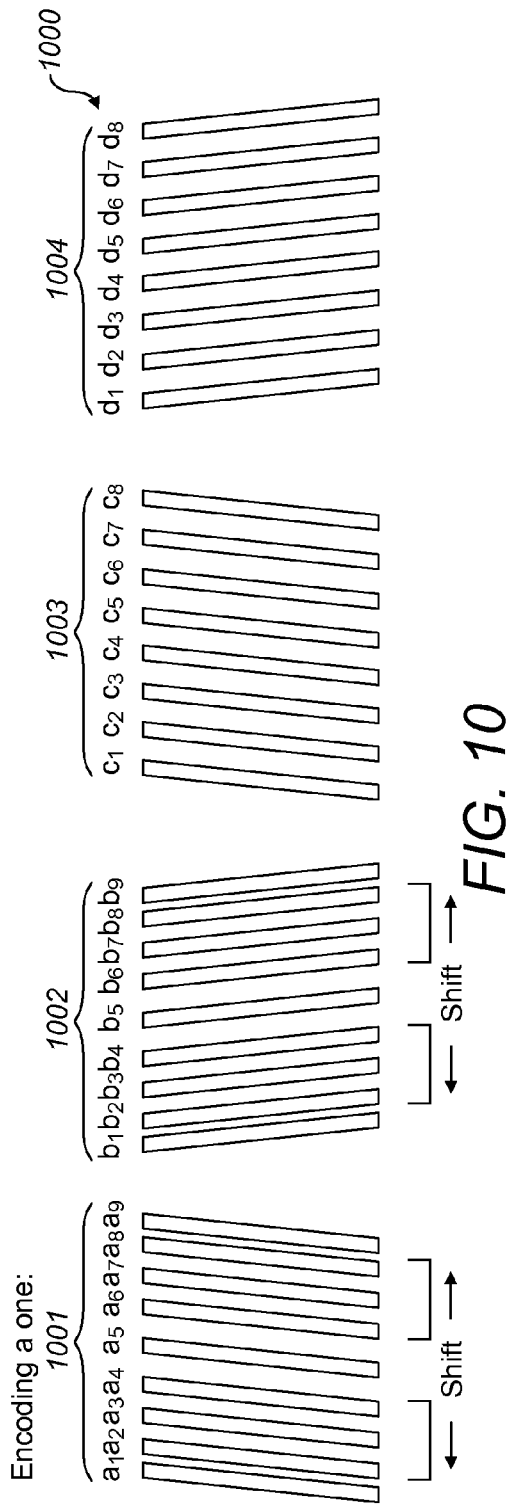
FIGS. 10 and 11 illustrate in exaggerated form respective alternative arrangements of servo elements encoding an LPOS bit having a value of one and an LPOS bit having a value of zero.
Figure 11:
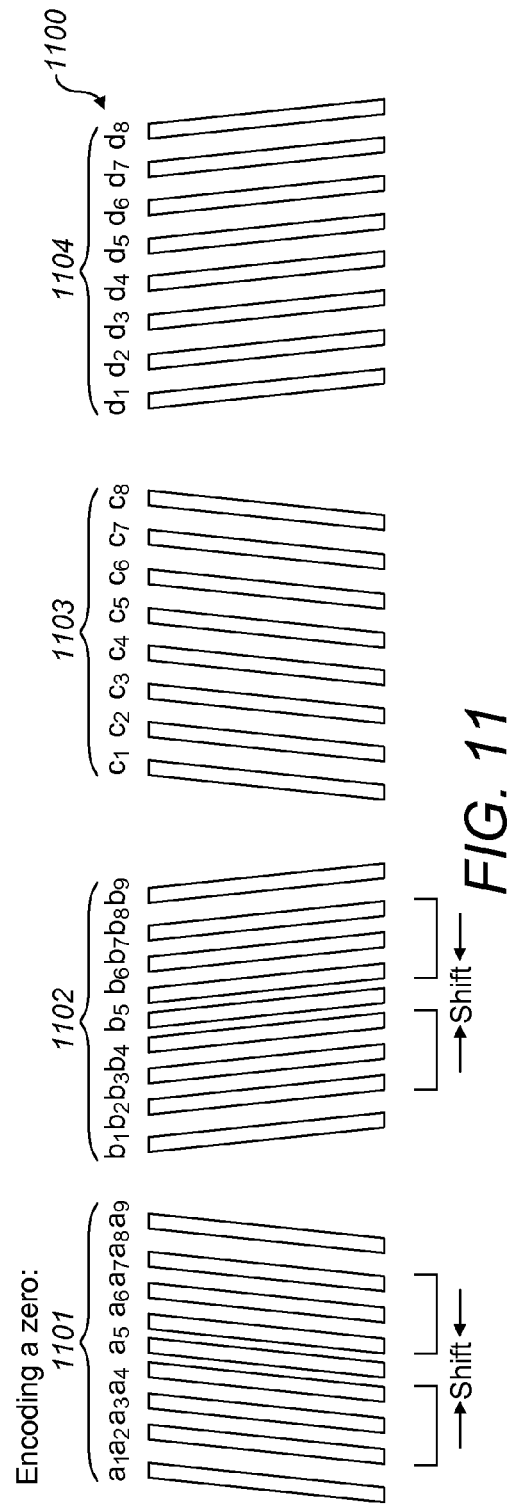
Figure 12:
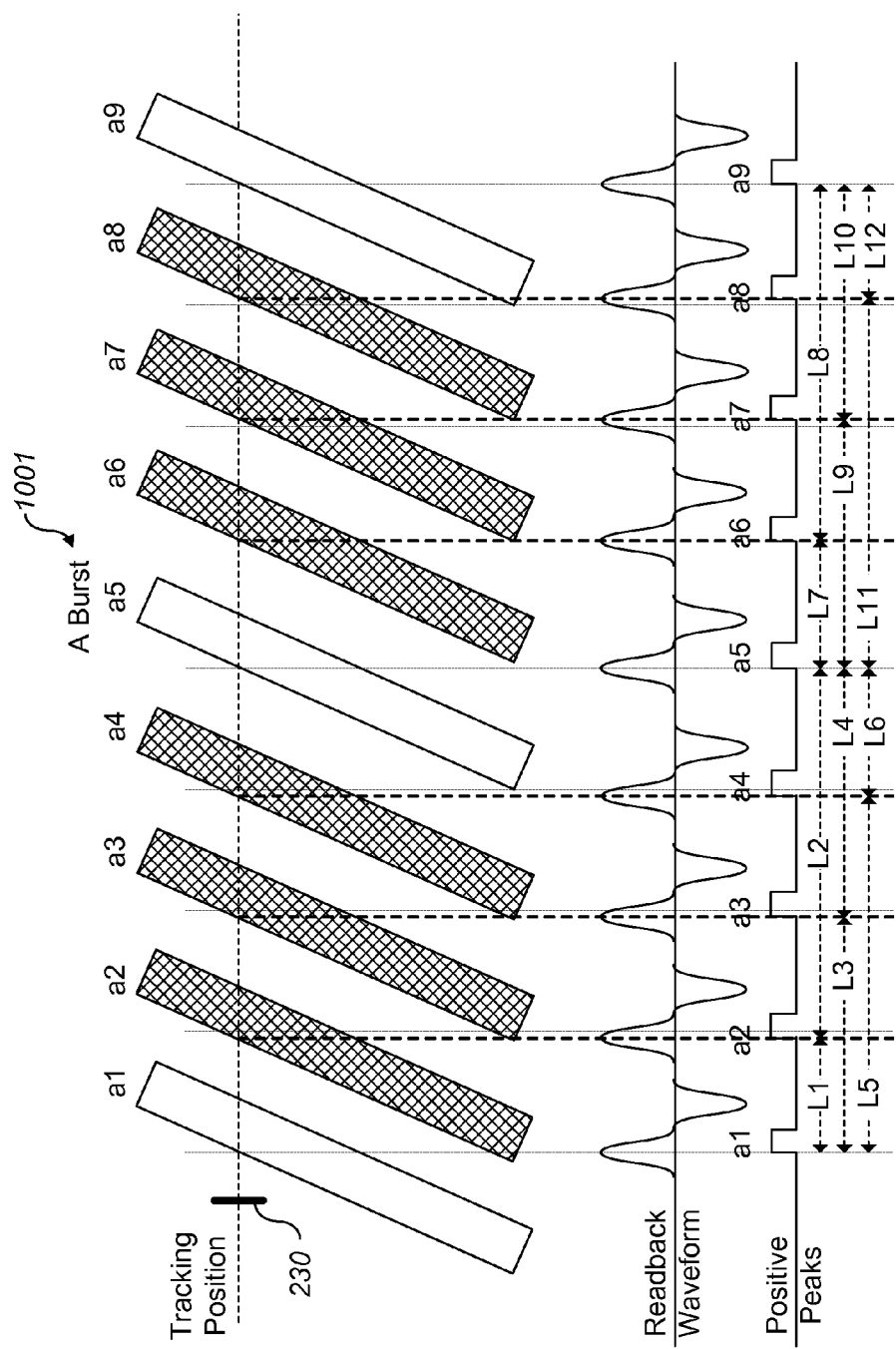
FIG. 12 shows an alternative servo element arrangement according to FIG. 10, together with data values that can be derived from signals generated using the servo elements.

FIGS. 10 to 12 relate to an alternative embodiment, in which the number of stripes in a servo frame 1000, 1100 is further increased. The A and B bursts 1001, 1101, 1002, 1102 respectively contain nine stripes, and the C and D bursts 1003, 1103, 1004, 1104 respectively contain eight stripes. As best shown in exaggerated form in FIGS. 10 and 11, in the A and B bursts the number of shifted stripes in the unbroken sequences, for example a2, a3, a4 and a6, a7, a8 between the non-shifted stripes is increased to three, and the three non-shifted stripes are moved by a shift distance away from the central non-shifted stripe in each burst 1001, 1002 to encode a one and towards the central non-shifted stripe in each burst 1101, 1102 to encode a zero. In FIG. 12, narrower vertical broken lines correspond to theoretical regular (unshifted) positions of positive transitions of stripes a1-a9 of the A burst 1001 relative to an exemplary tracking position of the servo head element 230, and thicker vertical broken lines correspond to actual positions and signals of positive transitions of the shifted stripes a2, a3, a4, a6, a7, a8 for the same servo head element tracking position.

In the embodiment of FIGS. 10 to 12, appropriate processing apparatus can take a similar form to the processing apparatus 800 of FIG. 8, but is adapted to process the increased number of stripes in the A, B, C and D bursts, including the increased number of shifted stripes in the unbroken sequences. For example, to determine lateral position of the servo head element 230, the timestamp processor is operable to use the timestamps 809 to calculate and accumulate, for example, time differences b1–a1, b2–a2, b3–a3, b4–a4, b5–a5, b6–a6, b7–a7, b8–a8, or d1–c1, d2–c2, d3–c3, d4–c4, d5–c5, d6–c6, d7–c7, d8–c8 between respective corresponding positive signal peaks in consecutive bursts of opposite azimuth, and the time differences c1–a1, c2–a2, c3–a3, c4–a4, c5–a5, c6–a6, c7–a7, c8–a8 between respective corresponding positive peaks in selected bursts of the same azimuth. To generate the LPOS value the time difference values L1-L12, shown in FIG. 12, are accumulated, with a different sign (positive or negative) being used for the time differences L1, L3, L5, L8, L10, L12 involving the non-shifted stripes at opposite ends of a burst and the time differences L2, L4, L6, L7, L9, L11 involving the central non-shifted stripe. Considering the A burst 1001, the timestamp processor 815 is operable to calculate the LPOS value:

LPOS value=(a2–a1)–(a5–a2)+(a3–a1)–(a5–a3)+
(a4–a1)–(a5–a4)–(a6–a5)+(a9–a6)–(a7–a5)+
(a9–a7)–(a8–a5)+(a9–a8)

As previously, the timestamp processor 815 is operable to compare the LPOS value against a zero value to determine if the LPOS bit is a one or zero. The resultant LPOS bit, including any redundant LPOS bits, can be transmitted and further processed as described above. In alternative embodiments, there is provided a still further increased number of shifted stripes in the unbroken sequences, and the processing apparatus 800 of FIG. 8 is adapted accordingly to process frames having an increased number of stripes in the A, B, C and D bursts.

Figure 13:
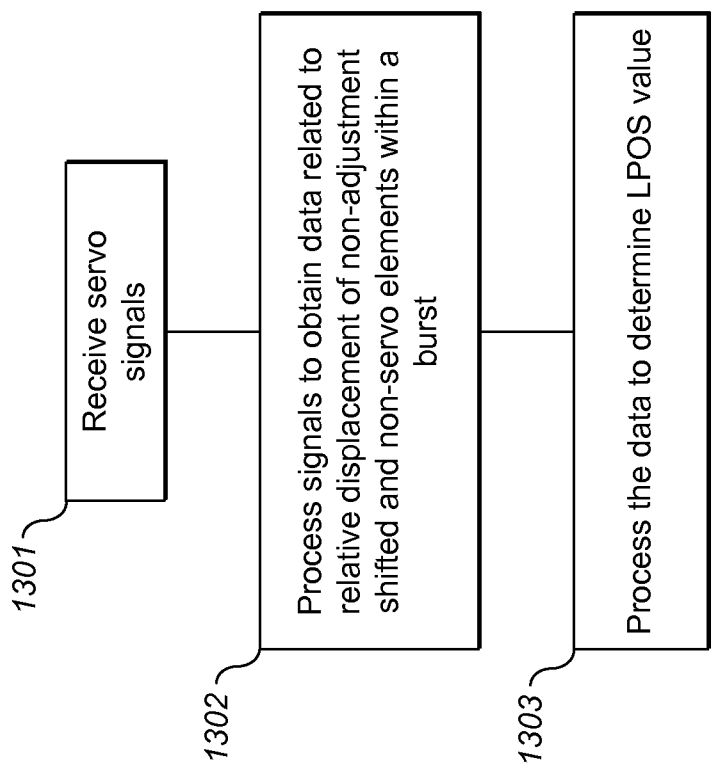
FIG. 13 is a flow diagram illustrating a method of decoding longitudinal position information.

FIG. 13 illustrates steps in a method of decoding LPOS information from servo elements, such as the servo stripes described with reference to FIGS. 6, 7, 9 and 10 to 12, arranged in a longitudinally extending sequence in servo bursts 901, 902, 1001, 1002, 1101, 1102 on a data storage medium, at least some of the servo bursts including non-shifted elements and an unbroken sequence of plural shifted elements. A signal waveform is generated by a transducer head apparatus detecting the servo elements as they are moved past servo head elements of the transducer head apparatus. The signals are received 1301 and processed 1302, for example using the apparatus described with reference to FIG. 8, or in any other convenient manner, to obtain data, for example L2, L3, L6, L7 (FIG. 9), related to relative displacement of respective mutually non-adjacent shifted and non-shifted elements within a servo burst and data, for example L1, L4, L5, L8 (FIG. 9), related to relative displacement of mutually adjacent shifted and non-shifted elements within the burst. The data is then further processed 1303, for example by accumulation as described above or in any other convenient manner, to determine an LPOS bit value. The LPOS bit value can be output, and a plurality of outputted LPOS bit values used to construct an LPOS word to control a position of the storage medium relative to the transducer head of a storage device such as a tape drive.

At least some of the embodiments described above are advantageous in that the increased number of servo elements in the bursts of a servo frame, compared to the known five stripe and four stripe LTO Ultrium servo frames, facilitates better recovery of position and/or speed information encoded in the servo frame, mitigating the effects of increased noise particularly in embodiments having a decreased data track pitch. In at least some of the embodiments, better recovery of LPOS information, for example a reduction in the effect of small tape defects or debris causing a shift in peak of one of the readback pulses, is concurrently facilitated by using data related to relative displacement of mutually non-adjacent shifted and non-shifted elements. For example the use of non-adjacent time difference values L2, L3, L6, L7 (FIG. 9) or L2, L3, L4, L5, L8, L9, L10, L11 (FIG. 12), in addition to the adjacent time difference values L1, L4, L5, L8 (FIG. 9) or L1, L6, L7, L12 (FIG. 12) increases the number of time difference values used from four in the known five stripe LPOS servo burst method to eight (FIG. 9) or twelve (FIG. 12). At least some of the embodiments provide servo bands that are easily readable in both directions of tape movement with relatively little adaptation needed to the decoding process between forward and reverse tape directions. The embodiments are easily applied to future formats requiring still greater numbers of servo elements per servo frame to cope with increasingly narrower data track pitch.

The terms processing apparatus and processor as used herein can include a computer processor (also called microprocessor), a microcontroller, a processor subsystem including one or more processors or microcontrollers, or any other convenient computing device, and can be implemented, according to cost constraints and the manufacturing flexibility required, by fixed hardware such as one or more integrated circuits, by computer program instructions executing, for example, on an embedded processor such as an ARM processor, by programmable hardware such as a field programmable gate array (FPGA), by any combination of the above, or in any other convenient manner.

The term memory includes any convenient form of processor-readable medium, for example nonvolatile memory technology including erasable and programmable read-only memories (EPROMs), electrically erasable and programmable read only memories (EEPROMs) and flash memories, and a combination of memories. Alternative possibilities include semiconductor memory devices such as dynamic or static random access memories (DRAM or SRAM), and also magnetic disks and other magnetic and/or optical media.

It will be appreciated that, while various embodiments are described herein with reference to data storage apparatus in the form of a single reel linear magnetic tape drive, aspects of the invention can also be applied to other forms of data storage apparatus that transfer data to and from a data storage medium comprising servo tracks to facilitate control of speed and position of data tracks on the data storage medium relative to transducer head apparatus of the data storage apparatus. For example, in alternative embodiments the data storage apparatus can comprise a tape drive for receiving two-reel cartridges, and/or can employ magnetic or optical tape, or can comprise other magnetic or optical storage technology.

The invention claimed is:

1. A decoder apparatus to decode longitudinal position (LPOS) information from servo elements arranged in a longitudinally extending sequence in servo bursts on a data storage medium, at least some of the servo bursts including non-shifted elements and an unbroken sequence of plural shifted elements, variations in the relative displacement of the non-shifted and shifted elements within a servo burst encoding the LPOS information, the decoder apparatus comprising:
   a detector to receive signals from a transducer head apparatus that detects the servo elements as they move past the transducer head apparatus;
   a processor to:
      process information produced from the signals to obtain data related to relative displacement of mutually adjacent shifted and non-shifted elements within respective ones of the servo bursts, and data related to relative displacement of mutually non-adjacent shifted and non-shifted elements within the respective ones of the servo bursts; and
      process the data to determine LPOS bit values corresponding to respective ones of the servo bursts.

2. The decoder apparatus of claim 1, wherein the processor is configured to further, for the unbroken sequence of plural shifted elements, to process the signals to obtain data related to the relative displacement of each shifted element in the unbroken sequence and the non-shifted element immediately preceding the unbroken sequence, and between each shifted element in the unbroken sequence and the non-shifted element immediately following the unbroken sequence, and process the data to determine LPOS bit values corresponding to the respective ones of the servo bursts.

3. The decoder apparatus of claim 1, wherein the processor is configured to:
   process the information produced from the received signals to generate time values related to the relative displacement of mutually adjacent shifted and non-shifted elements within the respective ones of the servo bursts, and to generate time values related to the relative displacement of mutually non-adjacent shifted and non-shifted elements within the respective ones of the servo bursts; and
   process the time values to determine LPOS bit values corresponding to respective ones of the servo bursts.

4. The decoder apparatus of claim 1, wherein the detector includes a pulse detector to detect pulses in read back waveforms generated from the servo elements, the decoder apparatus further comprising:
   a timestamp pre-processor to generate respective timestamps corresponding to the pulses and store the timestamps in a register, and
   wherein the processor includes a timestamp processor to process the stored timestamps to generate time difference values related to the relative displacement of shifted and non-shifted elements, accumulate a plurality of the time difference values for respective ones of the servo bursts, and compare the results of each accumulation with a reference value to determine respective LPOS bit values for the servo bursts.

5. A data storage apparatus comprising a transducer head apparatus (131), a drive apparatus to cause movement of a data storage medium relative to the transducer head apparatus, and a servo controller comprising the decoder apparatus of claim 1,
wherein the servo elements comprise azimuthally inclined stripes, and the servo controller is configured to process a plurality of the LPOS bit values to construct an LPOS word, and to use the LPOS word and lateral position information determined from the servo elements to control longitudinal movement of the storage medium and lateral movement of the transducer head apparatus.

6. A linear tape drive comprising the data storage apparatus as claimed in claim 5.

7. A method of decoding longitudinal position information from servo elements arranged in a longitudinally extending sequence in servo bursts on a data storage medium, at least some of the servo bursts including non-shifted elements and an unbroken sequence of plural shifted elements, variations in the relative displacement of the non-shifted and shifted elements within a servo burst encoding the LPOS information, the method comprising:
receiving signals from a transducer head apparatus that detects the servo elements as they move past the transducer head apparatus;
processing the signals to obtain data related to relative displacement of mutually adjacent shifted and non-shifted elements within respective ones of the servo bursts, and data related to relative displacement of mutually non-adjacent shifted and non-shifted elements within the respective ones of the servo bursts; and
processing the data to determine an LPOS bit value.

8. The method of claim 7, further comprising: outputting the LPOS bit value,
using a plurality of outputted LPOS bit values to construct an LPOS word, and
using the LPOS word to control a position of the data storage medium relative to a transducer head of a storage device.

9. The method of claim 7, comprising, for the unbroken sequence of plural shifted elements within a burst, processing the signals to obtain data related to the relative displacement of each shifted element in the unbroken sequence and the non-shifted element immediately preceding the unbroken sequence, and between each shifted element in the unbroken sequence and the non-shifted element immediately following the unbroken sequence, and processing the data to determine LPOS bit values corresponding to the respective ones of the servo bursts.

10. A data storage apparatus comprising:
a servo controller comprising a decoder apparatus to decode longitudinal position (LPOS) information from servo elements arranged in a longitudinally extending sequence in servo bursts on a data storage medium, at least some of the servo bursts including non-shifted elements and an unbroken sequence of plural shifted elements, variations in the relative displacement of the non-shifted and shifted elements within a servo burst encoding the LPOS information;
a drive apparatus to cause longitudinal movement of the data storage medium; and
a transducer head apparatus to generate signals from the servo elements as the data storage medium moves past the transducer head apparatus;
the servo controller to:
receive signals generated by the transducer head apparatus;
process the signals to obtain data related to relative displacement of mutually adjacent shifted and non-shifted elements within respective ones of the servo bursts, and data related to relative displacement of mutually non-adjacent shifted and non-shifted elements within the respective ones of the servo bursts;
process the data to determine LPOS bit values corresponding to respective ones of the servo bursts;
use a plurality of the determined LPOS bit values to construct an LPOS word; and
output the LPOS word for controlling the drive apparatus.

11. The data storage apparatus of claim 10, wherein:
the decoder apparatus is to decode the LPOS information in which the at least some servo bursts comprise at least three non-shifted elements, and unbroken sequences of plural shifted elements between each non-shifted element and a next sequential non-shifted element, the unbroken sequences containing the shifted elements in equal numbers; and
the servo controller is further, for a given one of unbroken sequences of plural shifted elements within a servo burst, to process the signals to obtain data related to the relative displacement of each shifted element in the given unbroken sequence and the non-shifted element immediately preceding the given unbroken sequence, and between each shifted element in the given unbroken sequence and the non-shifted element immediately following the given unbroken sequence, and process the data to determine LPOS bit values corresponding to the respective ones of the servo bursts.

* * * * *

UNITED STATES PATENT AND TRADEMARK OFFICE
CERTIFICATE OF CORRECTION

PATENT NO.        : 8,611,039 B2
APPLICATION NO.   : 13/260174
DATED             : December 17, 2013
INVENTOR(S)       : Donald Fasen It is certified that error appears in the above-identified patent and that said Letters Patent is hereby corrected as shown below:

In the Claims

In column 11, line 6, in Claim 5, delete "apparatus (131)," and insert -- apparatus, --, therefor.

Signed and Sealed this
Sixth Day of May, 2014

Michelle K. Lee
*Deputy Director of the United States Patent and Trademark Office*